(12) United States Patent
Copeland (10) Patent No.: US 10,328,631 B2
(45) Date of Patent: Jun. 25, 2019

(54) APPARATUS AND MANDREL-ASSISTED METHOD FOR FORMING A PLASTIC PIPE SOCKET CONTAINING A RESTRAINED GASKET

(71) Applicant: McWane, Inc., Birmingham, AL (US)

(72) Inventor: Daniel A. Copeland, Bessemer, AL (US)

(73) Assignee: McWane, Inc., Birmingham, AL (US)

( * ) Notice: Subject to any disclaimer, the term of this patent is extended or adjusted under 35 U.S.C. 154(b) by 722 days.

(21) Appl. No.: 14/870,169

(22) Filed: Sep. 30, 2015

(65) Prior Publication Data

US 2017/0087760 A1    Mar. 30, 2017

(51) Int. Cl.
 *B29C 57/02* (2006.01)
 *B29K 27/06* (2006.01)

(52) U.S. Cl.
 CPC ........ *B29C 57/025* (2013.01); *B29K 2027/06* (2013.01)

(58) Field of Classification Search
 CPC ...... B29C 57/025; B29C 57/04; F16L 37/092; F16L 37/0925
 See application file for complete search history.

(56) References Cited

U.S. PATENT DOCUMENTS

| | | | | |
|---|---|---|---|---|
| 4,120,521 A | * | 10/1978 | Parmann | B29C 57/025 285/113 |
| 4,127,290 A | * | 11/1978 | Mutschlechner | F16L 21/06 285/343 |
| 4,379,559 A | * | 4/1983 | Bohman | F16L 17/035 138/109 |
| 4,572,523 A | * | 2/1986 | Guettouche | F16L 17/035 277/616 |
| 4,818,209 A | * | 4/1989 | Petersson | B29C 57/025 425/392 |
| 4,826,028 A | * | 5/1989 | Vassallo | B29C 57/025 277/615 |
| 5,306,371 A | * | 4/1994 | Ramey | B29C 53/824 156/169 |
| 6,033,617 A | * | 3/2000 | Guzowski | B29C 57/025 264/249 |
| 6,113,159 A | * | 9/2000 | Corbett, Jr. | F16L 21/03 264/322 |
| 6,129,391 A | * | 10/2000 | Rakieski | F16L 25/009 285/337 |

(Continued)

*Primary Examiner* — Matthew J Daniels
*Assistant Examiner* — Andrew D Graham
(74) *Attorney, Agent, or Firm* — C. Brandon Browning; Maynard, Cooper & Gale, PC (57) ABSTRACT

A method for manufacturing a plastic pipe including covering the teeth of a plurality of restraining segments circumferentially arranged and embedded within an annular gasket with a covering and placing the annular gasket on a mandrel with the covering arranged between the restraining segments and mandrel. The annular gasket and mandrel and are inserted into an end of a heated plastic pipe for forming a socket in the end of the plastic pipe, the socket including an annular cavity formed by the annular gasket. Upon removal of the mandrel from the socket, the covering functions to prevent acutely pointed teeth of the restraining segments from impinging upon the mandrel thereby allowing removal of the mandrel from the socket without removal of the annular gasket from the annular cavity.

11 Claims, 8 Drawing Sheets

(56) References Cited

U.S. PATENT DOCUMENTS

| | | | | |
|---|---|---|---|---|
| 6,328,313 B1 * | 12/2001 | Teranishi | ............... | F02F 11/002 277/592 |
| 2005/0046189 A1 * | 3/2005 | Corbett, Jr. | ......... | F16L 37/0845 285/374 |
| 2006/0119100 A1 * | 6/2006 | Jones | .................. | F16L 37/0925 285/374 |
| 2009/0060635 A1 * | 3/2009 | Jones | .................. | F16L 37/0845 403/14 |
| 2009/0174181 A1 * | 7/2009 | Irwin | ..................... | B25B 27/10 285/34 |
| 2010/0264645 A1 * | 10/2010 | Jones | .................. | F16L 37/0925 285/105 |
| 2011/0062700 A1 * | 3/2011 | Corbett, Jr. | ......... | F16L 37/0925 285/31 |
| 2011/0254266 A1 * | 10/2011 | Guzowski | ............... | B29C 65/18 285/21.1 |
| 2016/0076682 A1 * | 3/2016 | Conrad | .................. | B29C 65/18 285/21.1 |
| 2016/0223109 A1 * | 8/2016 | Lopez-Chaves | ....... | F16J 15/022 |
| 2017/0328503 A1 * | 11/2017 | Copeland | ............ | F16L 37/08 |
| 2017/0370505 A1 * | 12/2017 | Copeland | ............ | F16L 37/0845 |

\* cited by examiner

APPARATUS AND MANDREL-ASSISTED METHOD FOR FORMING A PLASTIC PIPE SOCKET CONTAINING A RESTRAINED GASKET

FIELD OF INVENTION

The present invention relates generally to an apparatus and method for forming a plastic pipe socket containing a restrained gasket and, more particularly, to a removable barrier configured for covering locking segment teeth of the restrained gasket during mandrel-assisted formation of the socket, the barrier shielding the teeth from the mandrel surface.

BACKGROUND OF THE INVENTION

A variety of industries utilize pipes formed from thermoplastic materials including, but not limited to, polyethylene, polypropylene and PVC. Joints between sections of such plastic pipes may be formed by inserting the spigot end of one pipe into the bell socket end of a second pipe. Such socket and spigot pipe joints between plastic pipes are well known in the art. For example, U.S. Pat. No. 3,539,205 discloses a pipe joint including a plastic pipe with a bell end portion further having an annular gasket seat portion for containing an annular gasket. The spigot end portion of another pipe is inserted into the bell end portion and through the annular gasket wherein the annular gasket forms a seal between the bell end portion and the spigot end portion.

The use of a gasket not only improves the seal of the pipe joint, but also allows either a restrained or unrestrained pipe joint depending on the particular type of gaskets used. The formation of a thermoplastic pipe with a bell socket end containing a gasket cavity, however, typically requires the use of expensive machinery, such as expandable mandrels, to achieve the differential internal diameters of the bell socket. Further, corrosion of restraining gaskets placed within the gasket cavity may reduce the shelf life of such pipes. Therefore, a need exists for a less expensive systems and methods for the production of thermoplastic pipes, which contain not only a bell socket end, but also a gasket cavity containing a toothed restraining gasket.

SUMMARY OF THE INVENTION

The present disclosure is directed to improved systems and methods of manufacturing plastic pipes, wherein such pipes have a bell socket end and a second, opposing male or spigot end, such that the spigot end of one pipe is configured to fit into the bell socket end of a second pipe.

The present disclosure is also directed to a cover configured to adhere to the interior surface of a restraining gasket, the cover further including a pull tab configured to assist with removal of the cover from the restraining gasket.

The present disclosure is also directed to a method of preventing corrosion of a restraining gasket within a plastic pipe.

The present disclosure is also directed to an improved plastic pipe system and manufacturing method wherein the bell socket end of the plastic pipe contains a gasket cavity formed by sliding a heated plastic pipe over a Rieber gasket and restraining gasket spanning the exterior surface of a mandrel.

The present disclosure is also directed to an improved plastic pipe manufacturing method wherein the manufactured pipes are configured to maintain an airtight and watertight seal, including when such pipes are under high pressure.

According to one aspect of the invention, there is provided a method of forming a socket in an end of a plastic pipe. The method includes providing an annular gasket having a locking segment at least partially embedded therein, the locking segment including a tooth extending radially inward through an inner radial face of the annular gasket, inserting an end of a mandrel through a central opening of the annular gasket, and arranging a barrier member between the tooth and exterior surface of the mandrel, the barrier member being configured for preventing direct contact between the tooth and the mandrel. The end of the plastic pipe is heated, and the mandrel is inserted into the end of the plastic pipe thereby forming a socket in the end of the plastic pipe, the socket including an annular cavity containing the annular gasket. Thereafter, the plastic pipe is cooled, and the mandrel is removed from the plastic pipe without removing the annular gasket from the gasket cavity. When desired, the barrier member is removed from the annular gasket, for example, immediately before forming a pipe joint with the socket.

Other objects, features and advantages of the present disclosure will become apparent from the following detailed description given with reference to the accompanying figures.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to methods for manufacturing an improved plastic pipe. One method includes the steps of heating a plastic pipe, inserting a mandrel into the heated plastic pipe to form a bell socket end, wherein the mandrel includes a Rieber gasket and a restraining gasket spanning the outer surface of the mandrel, wherein a cover is adhered to the interior surface of the restraining gasket, cooling the plastic pipe, and removing the mandrel from the plastic pipe, wherein the Rieber gasket and restraining gasket remain within a gasket cavity formed in the newly-formed bell socket end of the plastic pipe. The method results in the bell socket end of the pipe having an interior diameter greater than the exterior diameter of the opposing, spigot end of the pipe, wherein the bell socket end further includes a gasket cavity with a greater diameter than the remainder of the bell socket end. The cover on the inner surface of the restraining gasket prevents toothed restraints of the restraining segment form impinging upon the mandrel during removal of the mandrel from the plastic pipe thereby preventing the restraining gasket form being pulled out of the socket with the mandrel. The cover further protects the toothed restraints from corrosion that can be caused by exposure of the restraints to the elements, thereby increasing shelf life of the pipe joint.

The use of any and all examples, or exemplary language ("e.g.," "such as," or the like) provided herein, is intended merely to better illuminate the embodiments and does not pose a limitation on the scope of the embodiments.

As used herein, "alloy" means pure metals and metals including incidental impurities and/or purposeful additions of metals and/or non-metals. For example, alloy may mean aluminum. Other examples of alloys include brass, bronze, copper, duralumin, Inconel, nickel, steel, stainless steel, titanium, other alloys known to those skilled in the art, and combinations of the same.

As used herein, "plastic" means a thermoplastic, a thermoset plastic, polyvinyl chloride (PVC) or other extruded high molecular mass, organic polymer, and other plastics known in the art.

As used herein, "Rieber gasket" means a gasket containing a ring of alloy, such as an alloy wire, on the interior of the gasket and a flexible material, such as rubber, on the exterior of the gasket.

As used herein, "rubber" means any natural, cured, reclaimed, vulcanized and synthetic elastomers including, but not limited to, acrylic rubber, acrylonitrile butadiene rubber (nitrile or NBR), butyl rubber (IIR), ethylene propylene diene monomer (EPDM), fluoroelastomer rubber, hydrogenated nitrile rubber, styrene-butadiene rubber (SBR), silicone, and like flexible materials known in the art having elastic memory.

Throughout the accompanying drawings, identical or similar parts are represented by the same reference numerals and characters.

Figure 1:
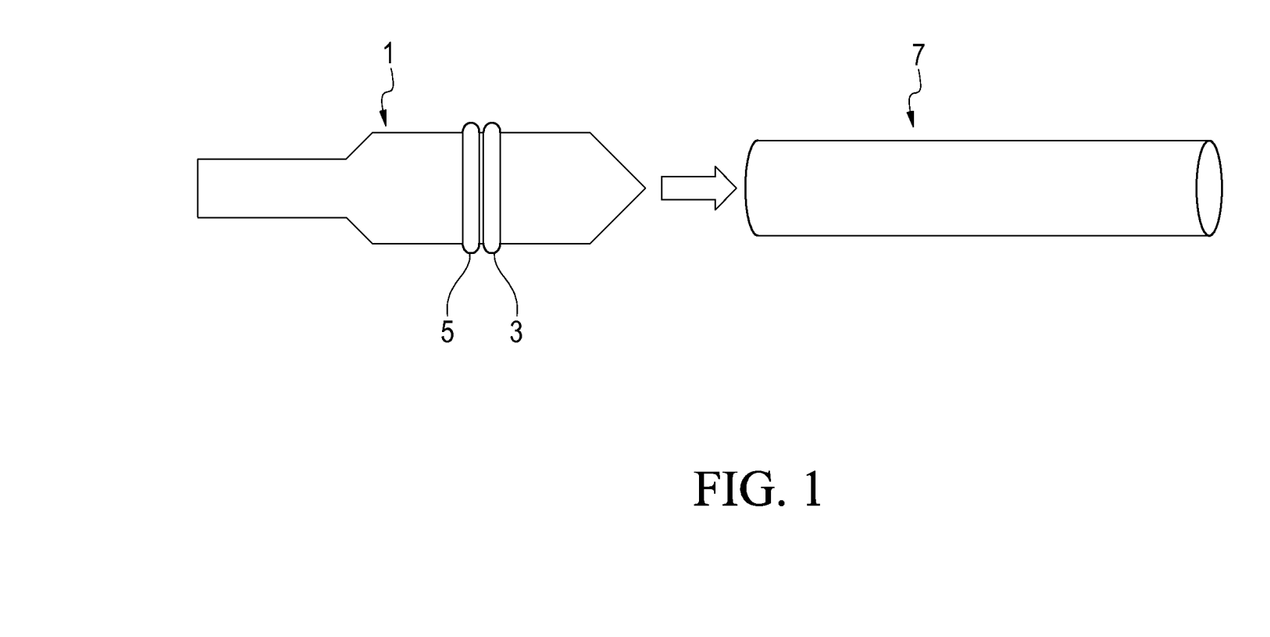
FIG. 1 is a perspective view of a mandrel, upon which a Rieber gasket and a restraining gasket are located, prior to insertion of the mandrel into a heated plastic pipe.

FIG. 1 depicts a non-expandable mandrel 1 and a plastic pipe 7. The mandrel 1 is generally cylindrical in shape. In certain embodiments, at least one end of the mandrel 1 is tapered such that, for a certain length from the end of the mandrel 1, the circumference of the mandrel 1 decreases with increasing proximity to its end. The tapered end enables the mandrel 1 to be inserted into a plastic pipe 7 which has a smaller interior diameter than the greatest outer diameter of the mandrel 1. In certain embodiments, the mandrel 1 is comprised of an alloy.

Figure 2:
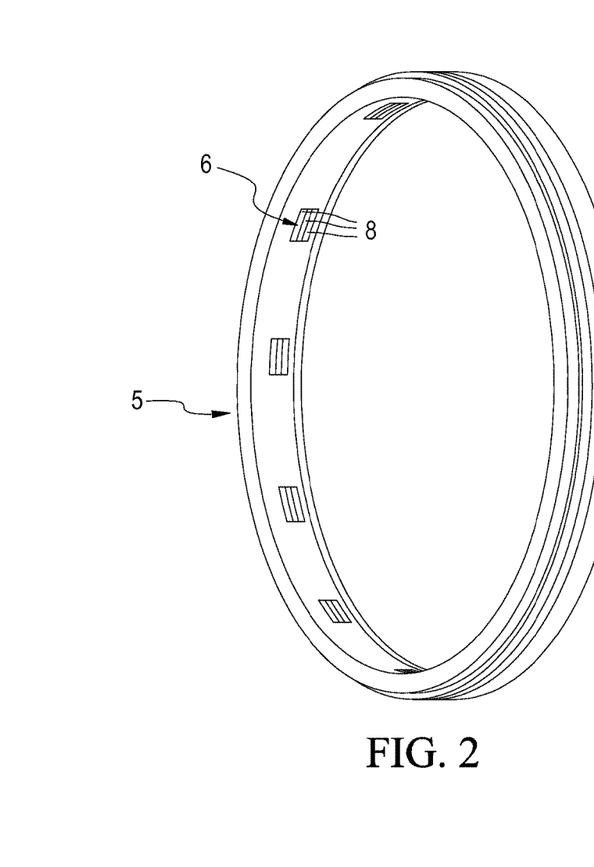
FIG. 2 is a perspective view of the restraining gasket of FIG. 1.
Figure 3:
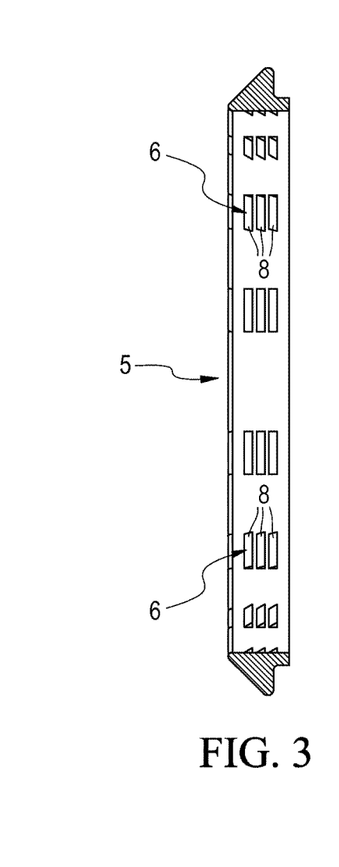
FIG. 3 is a sectional view of the restraining gasket of FIG. 2 displaying a barrier arranged to cover a plurality of locking segment teeth projecting radially inward through an inner radial face of the restraining gasket.

The mandrel 1 includes a Rieber gasket 3 spanning the outer circumference of the mandrel 1. The Rieber gasket 3 is adjacent to a restraining gasket 5, which is also spans the outer circumference of the mandrel 1. Referring to FIGS. 2 and 3, the restraining gasket 5 is a ring of rubber having a plurality of locking segments 6 circumferentially arranged and embedded therein. Each of the segments 6 includes a row of teeth 8 that extends radially inward from an inner radial surface of restraining gasket 5. The teeth 10 are configured for preventing the spigot end of a pipe from retreating out of a socket end of pipe in which the restraining gasket is seated. The number of locking segments 6 in a restraining gasket 5 may be adjusted depending on the predicted internal pressurization of the pipes. For example, higher pressurized pipes may require more locking segments 6 than lower pressurized pipes.

The locking segments 6 of the restraining gasket 5 are configured such that, once engaged with the outer surface of a spigot end of a second pipe, they resist or impinge the withdrawal of the second pipe 15. For example, the teeth 8 of the locking segments may be angled away from the opening bell socket end 9 of the pipe 7 such that the resistance the restraining gasket 5 imparts upon the second pipe is significantly greater when the second pipe is withdrawn from, compared to when the second pipe is inserted into, the pipe 7. This greater resistance is caused not only by the point ends of each tooth of the teeth 10 being directed into the surface of the second pipe, but also from the compression of the restraining gasket 5 caused by such withdrawal of the second pipe. In certain embodiments, the locking segments 6 are composed of an alloy. In certain embodiments, the locking segments 6 are composed of a composite.

In certain embodiments, the Rieber gasket 3 and restraining gasket 5 are compressible. In certain embodiments, the Rieber gasket 3 and restraining gasket 5 are elastomeric. When adjacent to one another, the Rieber gasket 3 and restraining gasket 5 form a generally semi-circular protrusion spanning the exterior surface of the mandrel 1.

Figure 4A:
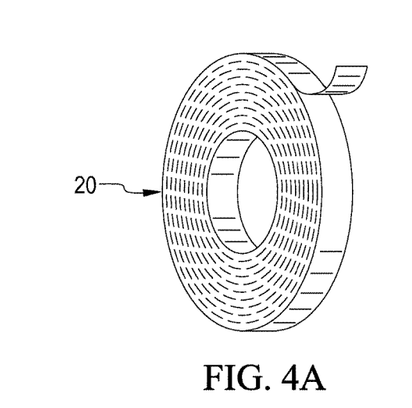
FIG. 4A is a perspective view of the barrier of FIG. 3 when provided as a roll.
Figure 4B:
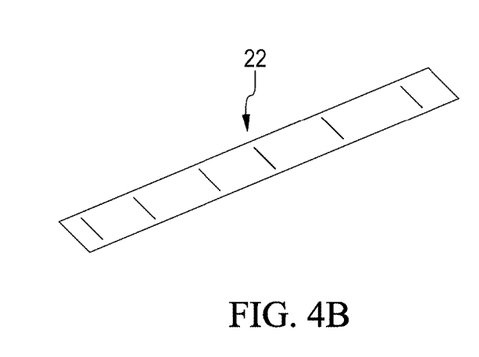
FIG. 4B is a perspective view of the barrier member of FIG. 3 when provided as a strip.
Figure 4C:
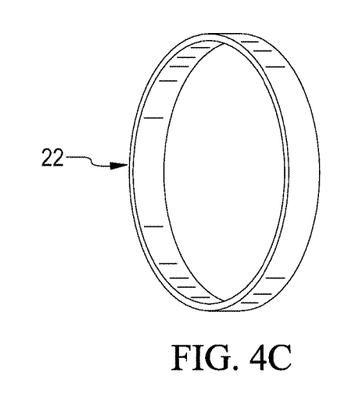
FIG. 4C is a perspective view of the barrier of FIG. 3 when provided as a rigid ring.
Figure 4D:
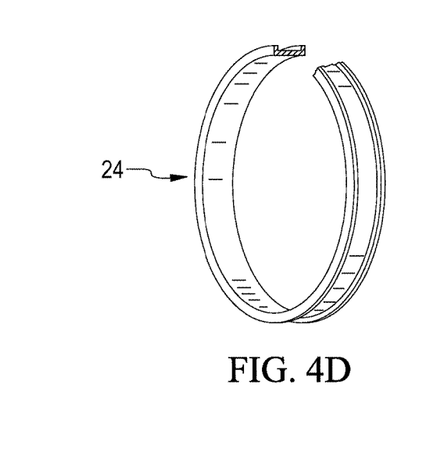
FIG. 4D is a perspective view of the barrier of FIG. 3 when provided as a semi-rigid ring

Extended over the teeth 8 of the locking segments 6 is a removable barrier 10 that is provided as a ribbon or tape that can be manually adhered to an inner radial surface 12 of the restraining gasket Sand over the teeth 8 of the locking segments 6. Referring to FIGS. 3 and 4D, barrier 10 includes a first side 14 supporting an adhesive and a smooth second side 16 opposite thereto. Barrier 10 can be provided as wound roll 18 that is unwound and applied to the inner radial surface 12 like a tape. Barrier 10 can also be provided as a flexible strip 20, a rigid ring 22 or a semi-rigid C-shaped member 24. Barrier 10 is configured for preventing the teeth 8 of the locking segments 6 from penetrating the barrier 10 when the restraining gasket 5 is located around the mandrel 1. Accordingly, the barrier 10 must have a thickness and hardness to prevent such penetration. To that end, the barrier 10 can be manufactured of thin sheets of plastic, metal or a combination of both.

Figure 5:
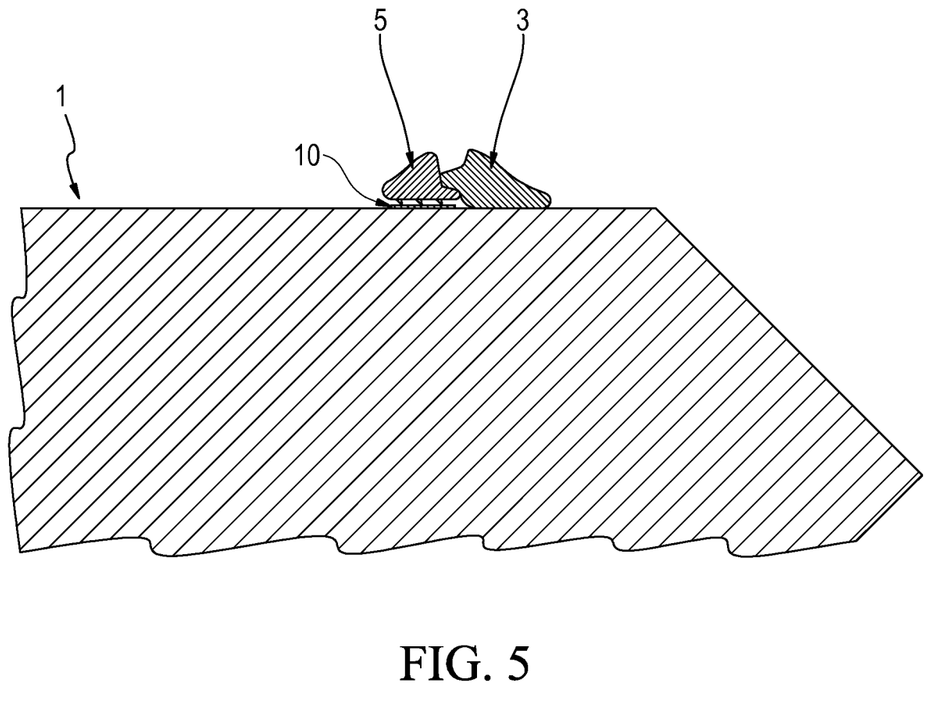
FIG. 5 is a sectional view of the restraining gasket of FIG. 2 located adjacent to the Rieber gasket and around the mandrel of FIG. 1.
Figure 6:
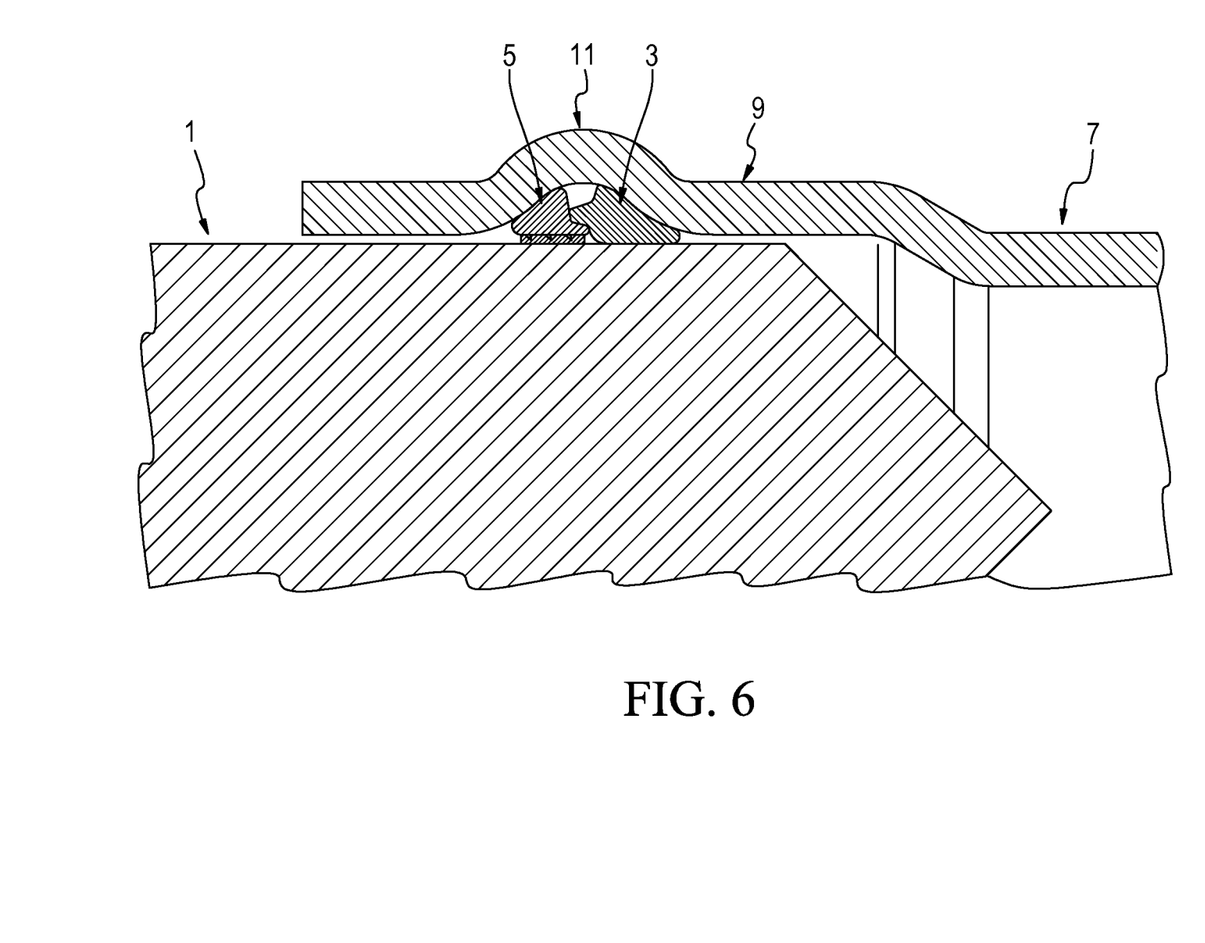
FIG. 6 is a sectional view of the mandrel of FIG. 3 inserted into an end of a plastic pipe.
Figure 7:
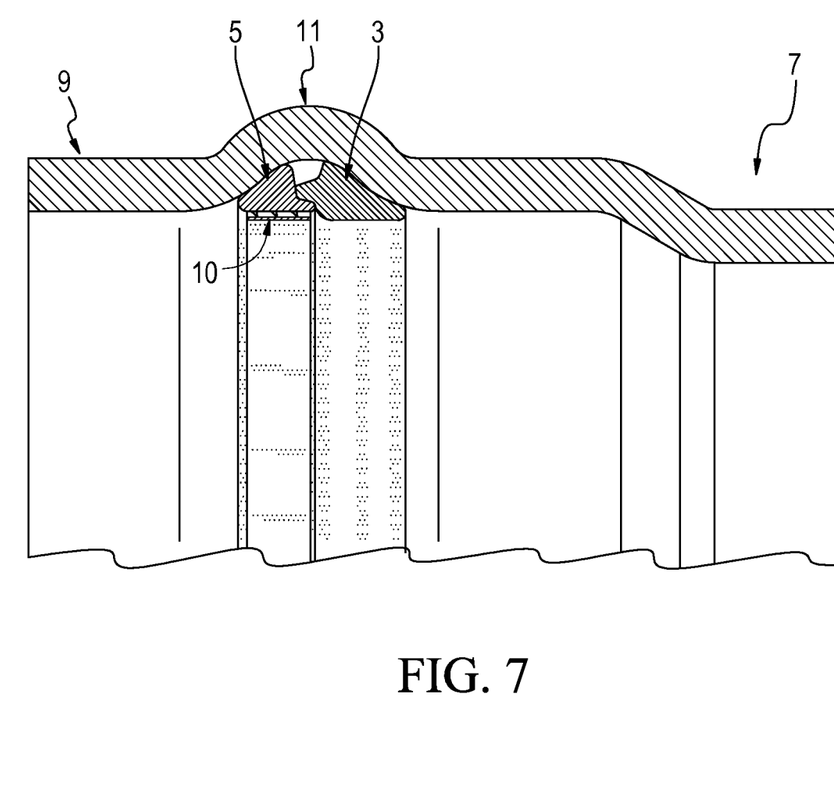
FIG. 7 is a sectional view of a socket formed within the end of the plastic pipe of FIG. 6.

Referring to FIGS. 5 through 7, there is depicted a method of forming within plastic pipe 7 a bell socket end 9 having a gasket cavity 11. The method includes heating at least one end of the plastic pipe 7 and inserting the mandrel 1, Rieber gasket 3 and restraining gasket 5 into the heated plastic pipe 7. Methods of heating and cooling plastic pipe 7 to a desired temperature are known in the art and include, without limitation, the use of heating and cooling stations, respectively. For example, one end of the plastic pipe 7 may be inserted into a heating station prior to insertion of the mandrel 1 into such end. Heating the plastic pipe 7 increases the malleability of the plastic pipe 7 and allows the plastic pipe 7 to slide and form over the exterior surface of the mandrel 1. Thus, as the inner diameter of the heated plastic pipe expands as the mandrel 1 slides along the inner surface of the plastic pipe 7, the plastic pipe adopts the shape of the mandrel 1, the Reiber gasket 3 and the restraining gasket 5. In this manner, the bell socket end 9 is formed within the plastic pipe with the gasket cavity 11 formed by the outer surfaces of the Reiber gasket 3 and restraining gasket 5. Thereafter, the plastic pipe 7 is cooled to harden the plastic and the mandrel 1 withdrawn from the plastic pipe 7. Since the teeth 8 of the locking segments 6 are covered by the barrier 10, the teeth 8 do not impinge upon the mandrel 1 as the mandrel is removed from the plastic pipe. Thus, during removal from the plastic pipe, the mandrel 1 slides along the smooth second side 16 of the barrier 10. This allows the retraining gasket 5 to remain in the gasket cavity 11, as desired.

Methods of inserting and removing the mandrel 1 from the plastic pipe 7 are known in the art and include, without limitation, the use of a hydraulic piston attached to the mandrel 1. For example, a hydraulic piston may be used to push the mandrel 1 into the plastic pipe 7 at a desired rate and pressure. Conversely, the hydraulic piston may be reversed to withdraw the mandrel 1 from the plastic pipe 7. The hydraulic piston apparatus may be configured with a sensor to detect force imparted on the plastic pipe 7 such that the hydraulic piston does not exceed a predetermined level of a force, thereby preserving the structural integrity of the plastic pipe 7. The hydraulic piston may also be programmed to insert the mandrel 1 a predetermined distance into the plastic pipe 7, allowing the formation of a bell socket of desired dimensions.

FIG. 7 depicts the Reiber gasket 1 and the restraining gasket 5 located within the gasket cavity 11 of the bell socket end 9 of the plastic pipe 7. The gasket cavity 11 formed by sliding the plastic pipe 7 over the Reiber gasket 3 and restraining gasket 5 has a semi-circular cross-section and spans the entire circumference of the bell socket end 9 of the plastic pipe 7. As shown in FIG. 7, the barrier 10 is in place over the teeth 8 of the locking segments 6 thereby protecting the locking segments 6 from possible corrosion brought about by exposure to water and the like.

Figure 8:
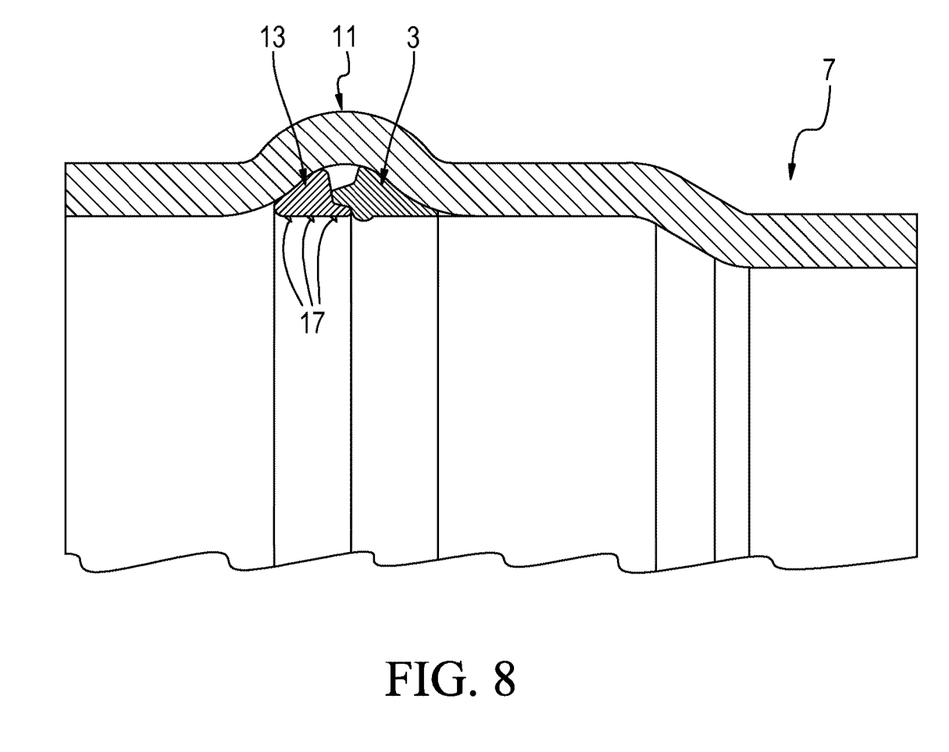
FIG. 8 is a sectional view of the socket of FIG. 7 with the barrier member removed.

Referring to FIG. 8, the method further includes removing the barrier 10 from the restraining gasket 5. Removal of the barrier 10 can be performed any time after removal of the mandrel 1 from the socket 9 or immediately before a spigot end of another pipe is inserted into the socket to form a restrained joint. Preferably, the barrier 10 remains adhered to the restraining gasket 5 while the plastic pipe 7 is in storage and during transportation of the plastic pipe 7 so that the locking segments 6 are protected until use.

Figure 9A:
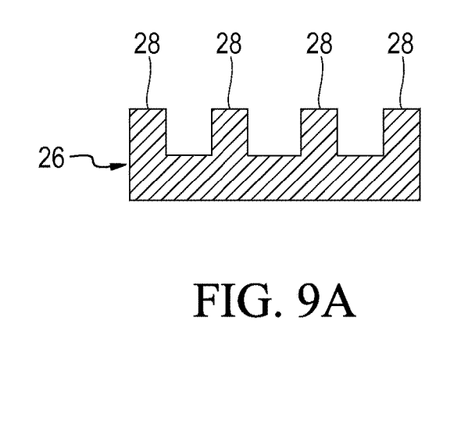
FIG. 9A is a partial sectional view of an annular restraining gasket having an alternative barrier member arranged to cover a plurality of restraining segments projecting radially inward through an inner radial face of the annular restraining gasket.
Figure 9B:
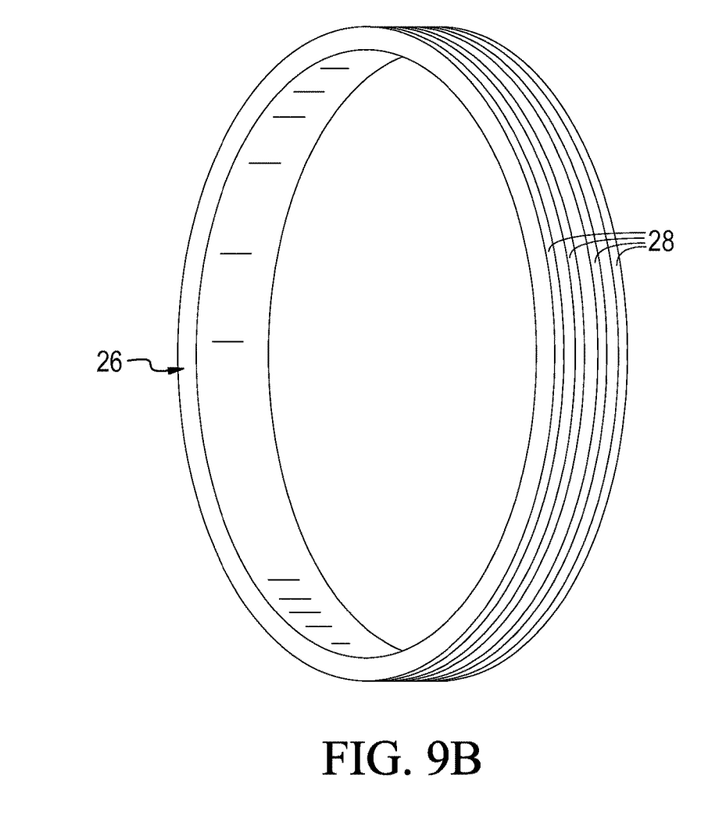
FIG. 9B is a perspective view of the barrier member of FIG. 9A.

Referring to FIGS. 9A and 9B there is depicted an alternative barrier 26 that includes a plurality of outwardly radiating ribs 28 arranged to extend between the rows of teeth 8 of the locking segments 6. The ribs 28 function to resist the outward radial pressure exerted by the mandrel 1 on the restraining gasket 5 and thereby resisting penetration of the teeth 8 through the barrier 10.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The various methods and embodiments described herein are exemplary and are not intended to limit the interpretation of this disclosure. Various other methods and embodiments for the manufacture of pipe are possible.

Now, therefore, the following is claimed:

1. A method of making a plastic pipe with a bell socket comprising:
   heating a plastic pipe,
   adhering a removable protective cover directly to an interior surface portion of a restraining gasket, wherein the restraining gasket includes at least one toothed-restraint having a pointed tooth extending radially inward from the interior surface portion of the restraining gasket,
   arranging the restraining gasket with the removable protective cover adhered thereto and a Reiber gasket adjacent to one another on a mandrel, the removable protective cover preventing the pointed tooth from impinging into the mandrel,
   inserting the mandrel into the plastic pipe to form a bell socket in an end of the plastic pipe, the bell socket having a diameter that is greater than a diameter of a remainder of the plastic pipe and a gasket cavity formed by outer surfaces of the Reiber gasket and the restraining gasket, the gasket cavity having a diameter that is greater than a diameter of a remainder of the bell socket,
   cooling the plastic pipe, and
   withdrawing the mandrel from the plastic pipe with the removable protective cover adhered to the interior surface portion of a restraining gasket.

2. The method of claim 1 wherein the Reiber gasket and the restraining gasket with the removable protective cover adhered to the interior surface portion thereof remain in the gasket cavity upon withdrawal of the mandrel from the plastic pipe.

3. The method of claim 2 comprising removing the protective cover from the restraining gasket after the mandrel is withdrawn from the plastic pipe.

4. The method of claim 1 wherein the toothed-restraint is composed of a metal.

5. The method of claim 1 comprising arranging an adhesive to be between the removable protective cover and the tooth.

6. The method of claim 1 comprising arranging an adhesive to be between the removable protective cover and the interior surface portion of the restraining gasket.

7. The method of claim 1 comprising forming the removable protective cover into a cylinder.

8. The method of claim 1 comprising removing the mandrel from the plastic pipe without decreasing an outer diameter of the mandrel.

9. A method of forming a socket in an end of a plastic pipe comprising:
   providing an annular gasket having a locking segment at least partially embedded therein, the locking segment including a tooth extending radially inward through an inner radial face of the annular gasket,
   inserting an end of a mandrel through a central opening of the annular gasket,
   placing a barrier member between the tooth and the mandrel, the barrier member being removably adhered to the inner radial face of the annular gasket using an adhesive and configured for preventing direct contact between the tooth and the mandrel, inserting the mandrel, the barrier and the annular gasket into the end of the plastic pipe thereby forming the socket, and removing the mandrel from the central opening with the barrier remaining removably adhered to the inner radial face of the annular gasket.

10. The method according to claim 9 comprising removing the barrier member from the annular gasket after the mandrel is removed from the central opening.

11. The method according to claim 9 wherein the barrier member protects the tooth from corrosion.

\* \* \* \* \*